INVENTORS
Clifford C. Wrigley
John D. Malloy
BY
THEIR ATTORNEY

INVENTORS
Clifford C. Wrigley
John D. Malloy
BY
THEIR ATTORNEY

INVENTORS
Clifford C. Wrigley
John D. Malloy
THEIR ATTORNEY

United States Patent Office 3,071,210
Patented Jan. 1, 1963

3,071,210
HEAVY-DUTY TRUCK BRAKE
Clifford C. Wrigley, Grosse Pointe Woods, and John D. Malloy, Royal Oak, Mich., assignors to General Motors Corporation, Detroit, Mich., a corporation of Delaware
Filed Apr. 6, 1960, Ser. No. 20,297
12 Claims. (Cl. 188—18)

This invention relates to a vehicle brake and more particularly to a means of controlling the operation of a brake cooling fluid pump.

In a vehicle disc brake, considerable heat is dissipated within a very small volume. Due to the fact that the heat is dissipated in a confined location, a cooling fluid may be used to convey the dissipated heat to some external point where it may be radiated to the atmosphere. Where a cooling fluid pump is employed to provide positive circulation, it is desirable not to require maximum operating capacity of the pump at all times. On the contrary, it is desirable to limit the operation of the cooling fluid pump to operation responsive to the temperature of the cooling fluid. Accordingly, this invention is intended to provide a means for controlling the degree of operation of a cooling fluid pump in response to the temperature of the cooling fluid.

It is an object of this invention to provide a cooling fluid pump which utilizes the residual pressure of the fluid in the cooling system for controlling the operation of the cooling fluid pump.

It is another object of this invention to provide a venting means for limiting the operating pressure and thereby controlling the degree of operation of the cooling fluid pump.

It is a further object of this invention to provide a thermally responsive unit to control the operation of the cooling fluid pump which depends upon the temperature of the cooling fluid to regulate the degree of operation of the cooling fluid pump.

It is a further object of this invention to provide a predetermined degree of pumping in the cooling fluid pump of a brake cooling system in response to fluid pressure and also an additional control for regulating further operation in response to the temperature of the cooling fluid.

The objects of this invention are accomplished by employing a vehicle disc brake and a cooling fluid pump operating concentrically with the rotating discs of a vehicle brake. The cooling fluid pump operates between a reaction member which is mounted on a stator member and adjacent to one of the stator discs of a vehicle disc brake. The pressure from the cooling fluid pump is vented in such a manner that the pressure provides limited operation of the cooling fluid pump. The venting is controlled by a predetermined location on the reaction member and in turn the back pressure force on the surface abutting the cooling fluid pump.

An additional control means is provided which is a thermally responsive means contained within the cooling fluid pump. The thermally responsive means is controlled by the temperature of the cooling fluid and biases the cooling fluid pump to a contacting position on the reaction member as the thermally responsive unit engages one of the stationary discs. In this manner, a greater degree of operation of the cooling fluid pump is accomplished as the temperature of the cooling fluid rises. Accordingly, with a greater circulation of cooling fluid, a correspondingly greater rate of cooling is provided by the cooling fluid system. The control for the pump is thereby operated on an automatic basis which is regulated by the temperature of the cooling fluid as well as the predetermined rate of operation accomplished by the venting means.

Further objects and advantages of the present invention will be apparent from the following description, reference being had to the accompanying drawings wherein preferred embodiments of the present invention are clearly shown.

In the drawings:

FIGURE 1 discloses a cross section view of the vehicle disc brake and the relative location of the various parts.

Figure 1:
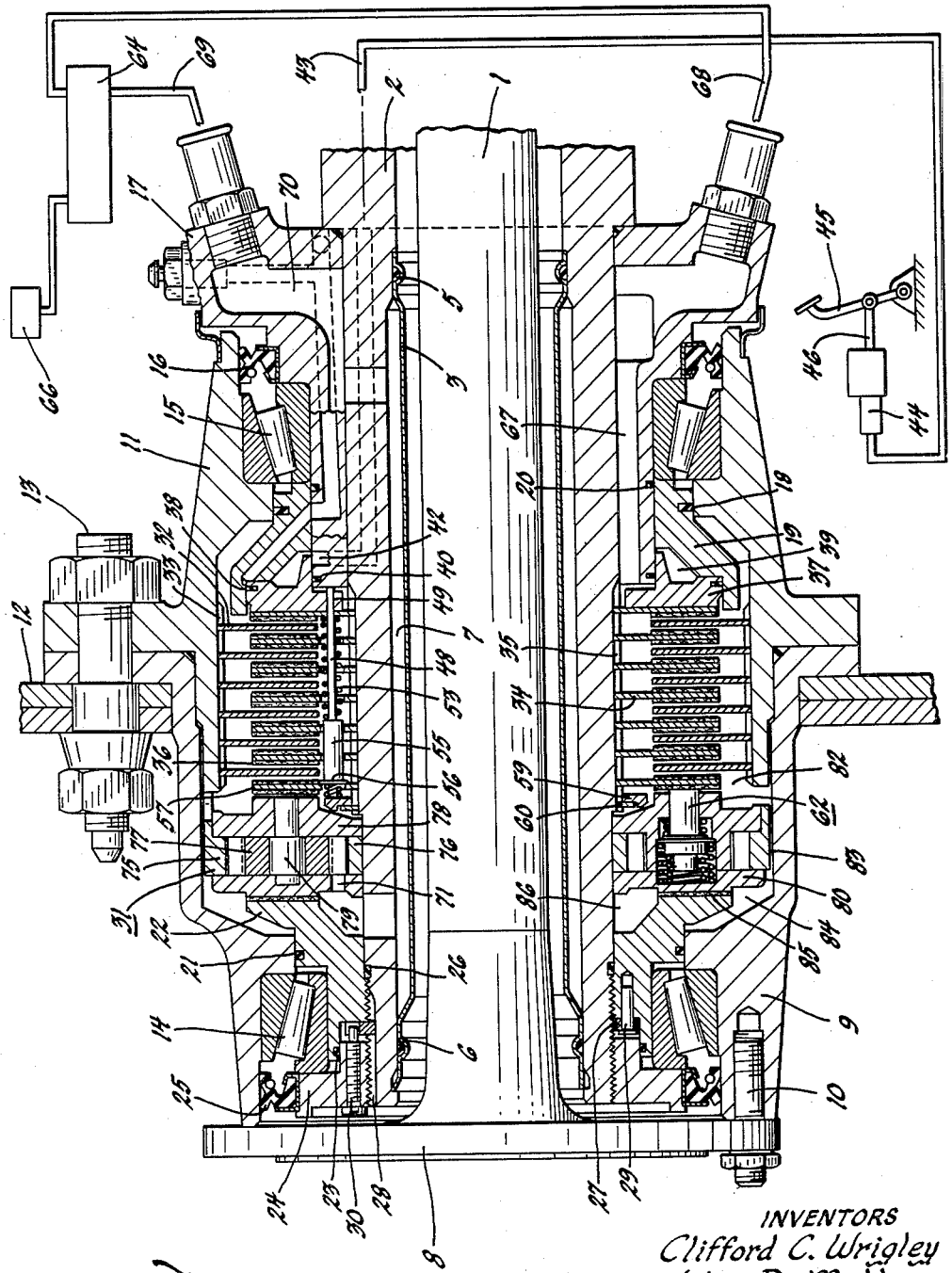

FIGURE 1 illustrates a cross section of the braking structure and the related parts of the fluid cooling pump. The drive shaft 1 rotates within the shaft housing 2. The sleeve 3 is fitted within the inner periphery of the shaft housing 2 and sealed on both ends by the seals 5 and 6. This provides a longitudinally extending passage 7 about the outer periphery of the sleeve 3 and the inner periphery of the shaft housing 2.

The outboard end of the shaft 1 is provided with radial flange 8 for fastening of the outer brake housing 9 by means of a plurality of bolts 10. This provides a rotating structure of the outer brake housing 9 and the shaft 1. The inner brake housing 11 is fastened to the outer brake housing 9 and to the wheel 12 by a plurality of wheel bolts 13.

The outboard end of the outer brake housing end of the outer brake housing 9 is rotatably mounted on a bearing assembly 14. The inboard end of the inner brake housing 11 is rotatably mounted on a bearing assembly 15.

The bearing assembly 15 is provided with a seal assembly 16 on its inboard end on the inner periphery of the inner brake housing 11 and the outer periphery of the oil delivery sleeve 17. A seal 18 is also disposed between the inner periphery of the inner brake housing 11 and the outer periphery of the annular hydraulic cylinder 19. An annular groove is placed on the outer periphery of the oil delivery sleeve 17 to accommodate a seal 20.

The outboard bearing assembly 14 is also sealed within its bearing chamber by a seal 21 on the inboard side and the outer periphery of the reaction plate 22. The reaction plate 22 is also provided with a seal 23 on its inner periphery for engaging the annular nut 24, and a seal assembly 25 is also placed on the outboard side of the bearing 14 engaging the outer periphery of the annular nut 24 and the inner periphery of the outer brake housing 9.

The reaction plate 22 threadedly engages the outboard end and the outer periphery of the shaft housing 2. A seal 26 seals this portion of the cooling system between the reaction plate and the shaft housing 2. The reaction plate threadedly advances as it is rotated on the shaft housing 2 and is locked in position by the locking plate 27. The locking plate 27 has a plurality of teeth on its inner periphery which slide longitudinally within the grooves 28 until the locking plate 27 engages the outboard end of the reaction plate 22. In this position, the lock pin 29 is inserted within the opening of the reaction plate. The annular bearing adjusting nut 24 is then rotatably fastened on the threaded portion of the shaft housing 2.

When the proper bearing adjustment is made, the locking screw 30 locks within the locking plate 27 and maintains a non-rotating relationship between the adjusting nut 24, the locking plate 27 and the reaction plate 22. In this manner, the bearings are properly adjusted as well as the proper clearance between the breaking disc within the brake housing.

The drawings in this application illustrate the cooling fluid pump, however, a more complete illustration and description of the cooling fluid pump may be had by referring to application Serial No. 20,298, filed April 6, 1960, now Patent No. 3,033,329, issued May 8, 1962, in the name of John D. Mallory and entitled, "Brake Cooling Fluid Pump."

The cooling fluid pump assembly 31 is concentrically mounted with the reaction plate for frictionally engaging a reaction plate 22. Inboard from the cooling fluid pump is mounted the braking disc stack. The rotating brake discs 32 are mounted on a splined portion 33. The stationary discs 34 are mounted on a splined portion 35 on the outer periphery of the stator member 2. The stator discs 34 are provided with frictional material 36 having radially extending grooves 125 to accommodate the flow of cooling fluid between the rotating and the stationary discs when the discs are frictionally engaging each other.

The cylinder 19 is concentrically mounted on the outer periphery of the oil delivery sleeve 17. Mounted on the oil delivery sleeve is a hydraulic piston 37 received in cylinder 19. The seal 38 between the cylinder 19 and the piston 37 forms a pressurizing chamber 39. The seal 40 is mounted on the inner periphery of the piston 37 and the outer periphery of the oil delivery sleeve 17.

The pressurizing chamber 39 is in communication with the passage means 42 which is connected to the conduit 43. The conduit 43 is connected to the master cylinder 44. The pedal 45 operating through the push rod 46 pressurizes fluid within the master cylinder 44 to actuate the vehicle brakes.

A retraction means is shown on the radially inner portion of the stator discs which biases the piston 37 to a retracted position as the brakes are released. The retraction means is more clearly shown in FIGURE 4. The retraction means includes a sleeve 48 which is extended through a perforation 49 in the piston 37. The sleeve 48 is provided with a longitudinally extending slot 50 as shown on the lower portion of the sleeve. The sleeve 48 receives a pin 51 having a shoulder 52 for engaging the outboard ends of the sleeve 48. The preengaging spring 53 is mounted concentrically around the sleeve 48 and engages a radial flange 54 on the inboard end of the sleeve 55. A radial flange 56 is formed on the outboard end of the sleeve 55 which engages the outboard stator disc 57. The shoulder portion 52 of the pin 51 engages the retraction spring 58. The outboard end of the retraction spring 58 engages an annulus 59. The annulus 59 is maintained in position by a snap ring 60.

The pin 51 engages the annulus 59 and biases the sleeve 48 to an adjusted position within the piston 37 as the brakes are actuated. A retraction spring 58 biases the sleeve 48 to its retracted position by means of the pin 51.

The preengaging spring 53 biases the sleeve 55 to an engaging position on the outboard stator disc 57 when the brakes are not actuated. This biasing force provides a reaction means for the thermally responsive means 62 mounted within the cooling fluid pump 31.

Figure 4:
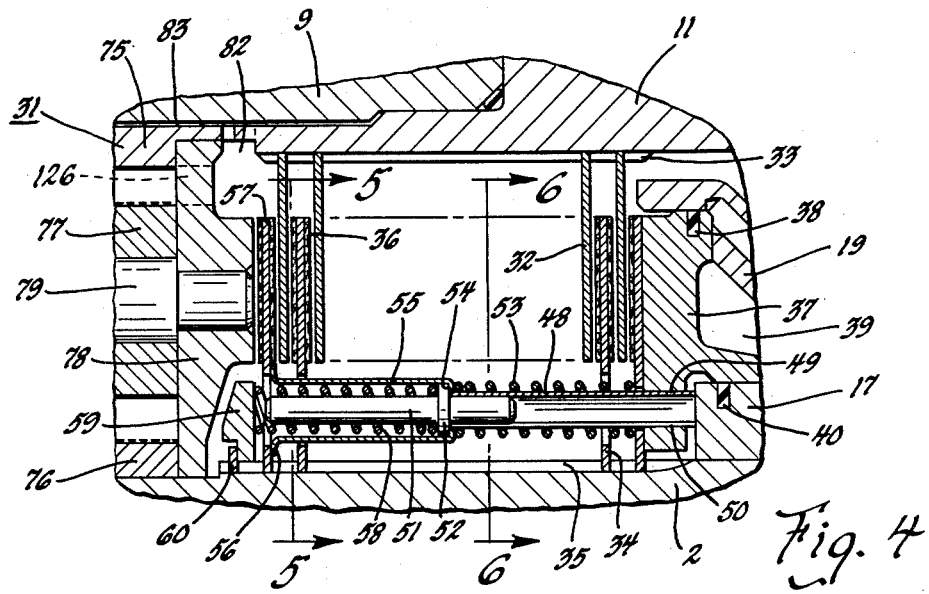
FIGURE 4 is a cross sectioned view illustrating the reaction means as well as a biasing means for controlling the position of the outboard stator disc.
Figures 5, 6:
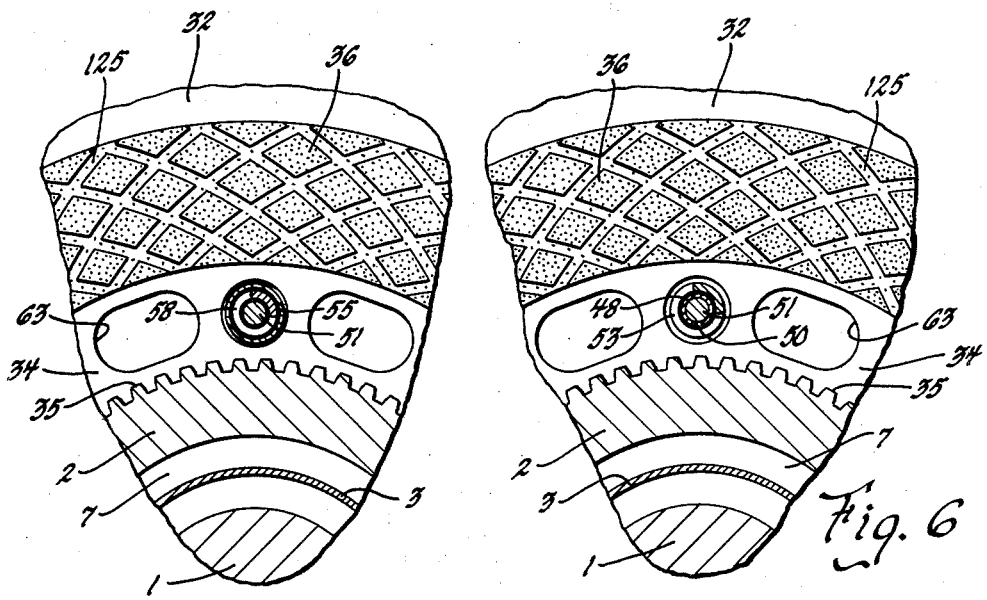
FIGURE 5 is a cross sectioned view taken on line 5—5 of FIGURE 4.
FIGURE 6 is a cross sectioned view taken on line 6—6 of FIGURE 4.

FIGURE 5 is taken on line 5—5 of FIGURE 4 and shows the reaction sleeve 55 mounted concentrically around the retraction spring 58. A plurality of openings 63 are provided on the radially inner portion of the stator discs to accommodate the flow of the cooling fluid as it flows to the reservoir 64.

FIGURE 6 is a cross-sectioned view taken on line 6—6 of FIGURE 4. This cross-sectioned view shows the pin 51 mounted within the sleeve 48. The preengaging spring 53 is also shown concentrically mounted around the outer periphery of the sleeve 48.

The cooling fluid system includes a fluid expansion tank 66 in communication with the reservoir 64. The fluid from the cooling pump 31 is discharged about the outer periphery of the brake discs and flows radially inward to the inner periphery of the braking means. From this point, the cooling fluid is discharged through the passage means 67 leading to the conduit 68 which feeds into the reservoir 64. The fluid leaves the reservoir 64 through the conduit 69 which passes through the passage means 70 which is in communication with the passage 7 on the outer periphery of the sleeve 3. The passage 7 is in communication with the inlet part 71 on the input side of the cooling fluid pump 31.

Figure 2:
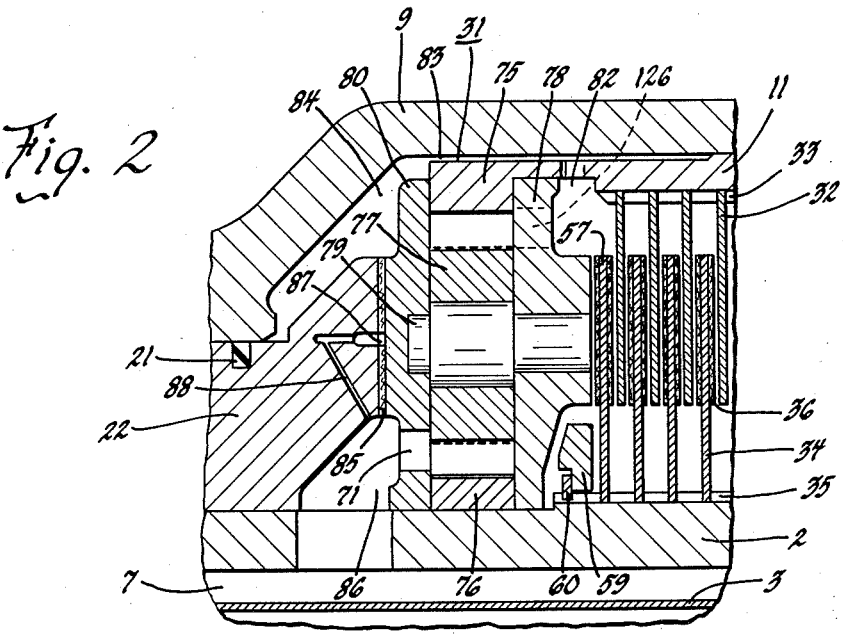
FIGURE 2 is an enlarged cross sectioned view of the cooling fluid pump and the venting means in the reaction member.
Figure 3:
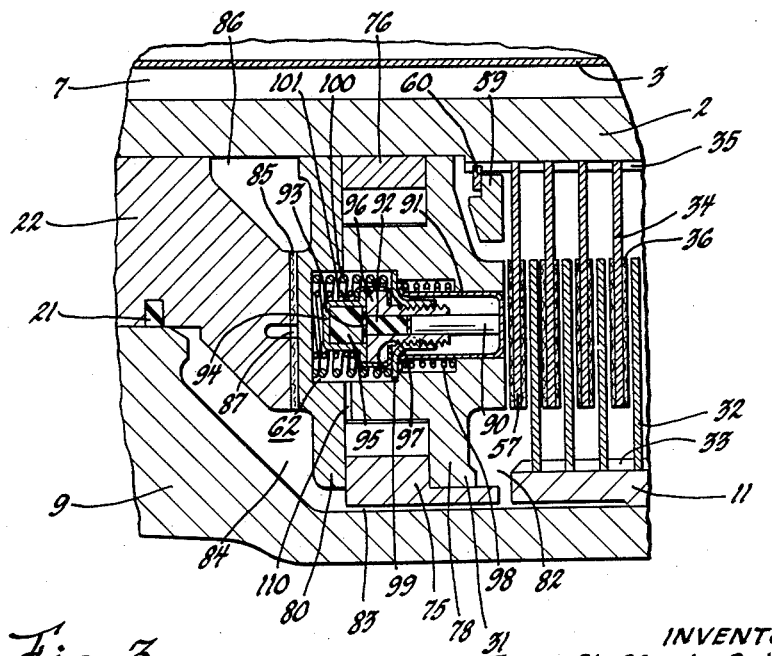
FIGURE 3 is an enlarged cross sectioned view of the thermally responsive means carried in the cooling fluid pump.

The cooling fluid pump 31 is more clearly shown in the enlarged cross sections of FIGURES 2 and 3. The cooling fluid pump includes a ring gear 75 and a sun gear 76. A plurality of planetary gears 77 mesh the ring gear 75 and the sun gear 76. The planetary gears are mounted within the pump casing 78 and are maintained in position by a plurality of pins 79. The outboard end of the pump casing 78 engages the cover plate 80 and the cover plate is maintained in a non-rotative position relative to a pump casing 78.

An inlet port 71 is in communication with the passage 7 for the inlet of the hydraulic cooling fluid. The fluid is pumped through the pump 31 and is discharged through port 126 into the high pressure chamber 82 on the outer periphery of the discs of the disc brake. As the cooling fluid pump 31 is in operation, the pressure is built up within the chamber 82 on the outer periphery of the brake discs. The inner brake housing 11 is spline-connected to the ring gear 75. The outer periphery of the ring gear 75 rotates within the inner periphery of the outer brake housing 9 with a limited passage 83 between the ring gear and the outer brake housing 9. The passage permits buildup of pressure within the limited passage 83 and the low pressure chamber 84. The pressure buildup within the chamber 82 biases the pump assembly to an outboard position and into engagement with the stator member 22. The frictional engagement of the stator member 22 and the cooling pump 31 causes a retardation of the pump casing 78 and the cover plate 80. The pump casing 78 and the cover plate 80 are locked in a non-rotative position relative to each other but rotate relative to the ring gear 75.

The fluid pressure in chamber 84 acting on the friction engaging surface 85 and the associated engaging surface of pump cover plate 80 decreases across the frictionally engaging surface 85 on the stator disc 22. The pressure in the supply chamber 86 is reduced due to the suction of the cooling fluid pump 31. A fluid pressure gradient is formed across the frictional surface 85 of the reaction plate 22. This fluid pressure gradient may be relieved by providing an annular groove 87 in the friction material 85 and then venting the groove 87 through a passage 88. The radial position of the annular groove 87 controls the differential lateral pressure on the pump 31 and in turn the degree of pump operation when the vehicle brakes are retracted. In this manner, a limited pump operation may be accomplished even though the vehicle brakes are in a retracted position.

An additional control means is also provided which is thermally responsive to the temperature of the cooling fluid of the vehicle disc brake. This thermally responsive unit 62 is shown in the enlarged cross-sectioned view of FIGURE 3. The thermally responsive unit includes the piston 90 engaging a shell 91 which contacts the outboard stator disc 57. The piston 90 extends inward to the plug 92 which contacts a diaphragm 93. A cup 94 encloses a thermally expandable element 95. The plug 92 is enclosed by the ring 96. The unit is fastened together by means of the sheet metal band 97 locking the unit in a permanent position. The element 95 expands in response to heating biasing the plug 92 and forcing the piston 90 to an outward position wherein the shell 91 engages the brake disc. The spring 98 returns the shell 91 to a retracted position contacting radial flange 99. The springs 100 and 101 provide a resilient seating for the thermally responsive unit 62. The chamber containing the thermally responsive unit is in communication with the cooling fluid of the cooling fluid system through passage 110. As the element 95 is heated, it expands forcing the plug 92 outwardly and biasing the piston 90 to form a contact between the shell 91 and the stator disc 57. This in turn biases the cooling pump to an engaging position with the frictional surface 85 of the reaction plate 22. The greater the expanding force of the thermal element 95, the greater the contact between the frictional surface 85 of the reaction plate and therefore the greater the pumping action of the cooling fluid pump. In this manner, the cooling fluid is circulated at a rate directly in response to the thermal condition of the cooling fluid.

The operation of this device will be described in the following paragraphs. The vehicle brakes are actuated by movement of the pedal 45 pressurizing fluid within the master cylinder 44 and the conduit 43 and the pressurizing chamber 39 of the cylinder 19. The pressurization of the fluid within the chamber 39 of the cylinder 19 forces the piston 37 to move axially and thereby compress the disc stack within the vehicle brake.

The reaction plate 22 is concentrically mounted on the shaft housing 2 and forms a reaction means as the vehicle brakes are actuated. The cooling fluid pump assembly 31 is concentrically mounted between the reaction plate 22 and the disc stack of the vehicle disc brake. The force in compressing the disc stack is transmitted through the cooling fluid pump assembly 31 to the reaction plate 22. In transferring the force from the disc stack to the reaction plate, a pumping action is generated in the pump 31. The ring gear 75 is spline-connected to the brake housing and rotates as the wheel rotates. The retardation of rotation of the pump casing 78 and the cover plate 80 causes the planetary gears 77 to rotate and thereby act on the ring gear 75 and the sun gear 76. This action of the gears causes a pumping action drawing fluid in the inlet port 71 and pressurizing the fluid in the chamber 82 about the outer periphery of the disc stack of the vehicle brake. It can be seen that the pumping action of the pump assembly 31 is directly in proportion to the retardation of the pump casing relative to the ring gear 75. In this manner the pumping action of the cooling fluid pump is in direct proportion to the engagement of the vehicle brakes.

The pumping action of the cooling fluid pump 31 pressurizes fluid within the chamber 82 about the outer periphery of the disc stack. The fluid then passes through radially extending passages 125 in the frictional material of the stator discs to the inner periphery of the disc stack. The fluid is then transferred to the passage 67 and the conduit means 68 which leads to the reservoir 64. The fluid is restricted in its flow into passage 67 by the stationary disc engaged by piston 37. While this disc may have openings 63 therein as do the other stationary discs of the disc stack, they are closed by piston 37. This is seen by comparing FIGURES 4 and 5. Therefore fluid from the chamber radially inward of the disc stack must pass through the spline connection of this disc with shaft housing 2 before it flows into passage 67. This restriction, together with the labyrinth effect of the disc stack, provides a sufficient restriction to permit a pressure build-up in the chambers as described. An expansion chamber 66 is in communication with the reservoir 64. Return conduit means 69 lead to the passages 70 and 7 which transmit the fluid to the return side of the cooling fluid pump 31.

Upon release of the brakes, the piston 37 is biased to a retracted position by the force of the retraction spring 58. The retraction spring 58 abuts the shoulder 52 of the pin 51 and transmits a force through the sleeve 48 to return the piston 37 to its normally retracted position.

The sleeve 48 has a longitudinal slot 50 and expands within the opening 49 of the piston 37 to maintain its relative position in the piston. The opposite end of the sleeve 48 grips the inboard end of the pin 51. The pre-engaging spring 53 biases the sleeve 55 to an engaging position on the outboard stator disc 57. This position of the sleeve 55 maintains a retracted position for the outboard stator disc and operates as a reaction means for the thermal unit 62 mounted within the pump assembly 31.

As the fluid cooling pump is in operation, a pressure is created within the chamber 82. The pressure within the chamber 82 is transmitted through the disc stack where a limited pressure is present within the inner periphery of the disc stack which forces the fluid to return to the reservoir 64. The outboard side of the cooling fluid pump 31 is biased inboard by a pressure created through the passage 83 about the outer periphery of the ring gear. This pressure to a certain degree counter balances the pressure on the inboard side of the cooling fluid pump 31. The pressure in chamber 84 produces a fluid pressure gradient from the outer periphery of the frictional material 85 on the reaction plate to the inner periphery of the frictional material 85 of the reaction plate. A suction is present within the chamber 86 when the cooling fluid pump is in operation. It may be seen from these pressures acting on the pump assembly 31 that the pump is biased to a frictional engaging position on the reaction plate 22. This causes a limited pumping action even though the vehicle brakes are retracted. The degree of the operation of the pump when the brakes are in the retracted position may be controlled to a certain extent by venting the frictional surface 85 of the reaction plate 22 by an annular groove 87. The annular groove 87 is vented to the suction side of the pump through the passage 88. The greater the area at low pressure the greater the pump actuation. The location radially of groove 87 determines the degree of actuation of the cooling fluid pump as it is idling when the brakes are retracted.

A plurality of thermally responsive units 62 are also provided within the cooling fluid pump assembly 31. Each thermally responsive unit includes an expandable element 95 which is mounted within the cup 94. The diaphragm 93 is placed on the inboard side of the expandable element 95 between the plug 92 and the thermal element 95. As the thermal elements 92 expand, a piston 90 is biased to an extended position carrying the shell 91 to a contacting position on the stator disc 57. The temperature of the cooling fluid controls the expansion of the element 95 through the opening 110 in the pump casing 78. The greater the rise in the temperature of the cooling fluid the greater the expansion of the element 95 and thereby biasing the shell 91 to an engaging position to a more firmly contacting position of the stator disc 57.

As a thermal unit 62 contacts the stator disc 57, the sleeve 55 forms a reaction means for this force on the inboard side of the stator disc 57. The pre-engaging spring 53 biases the sleeve 55 to a contacting position on the inboard side of the outboard stator disc 57. In this manner, the vehicle brakes are not actuated by the movement of the expandable element 95 and the operation of the plurality of thermal units 62. The force of the thermal unit 62 causes a frictional engagement of the shell 91 of the thermal unit 62 and the cover plate 80 with the reaction plate 22. The retardation of the cover plate 80 and the pump casing 78 cause an increased operation and pumping action of the cooling fluid pump 31. The degree of the increase in operation and pumping of the pump is controlled by the temperature of the cooling fluid. As the cooling fluid of the cooling fluid system is cooled below a certain temperature, the thermal units no longer bias the pump assembly to a frictional engaging position with the reaction plate and the stator disc 57.

It can be seen from this description of the operation, that a cooling fluid pump operates to a limited degree which is predetermined by the radical location of the annular groove 87 on the reaction plate. This provides limited operation and movement of the pump to prevent excessive wear. It also provides a limited operation to maintain a cool operating condition of the cooling fluid. The addition of the thermal unit 62 provides a means for operation of the cooling fluid pump after the brakes have been actuated and the cooling fluid is at a relatively high temperature. The operation of the cooling fluid pump continues until the fluid temperature is reduced to a certain value upon which the cooling fluid pump is no longer controlled by the thermal units and is controlled completely by the location of the annular groove 87 in the stator plate. The combination action of these two features provides an optimum operation of the cooling fluid pump for ideal operating conditions of the cooling fluid system.

While the embodiments of the present invention as herein disclosed, constitute a preferred form, it is to be understood that other forms might be adopted.

What is claimed is as follows:

1. In a vehicle brake, comprising in combination, a stationary member, at least one stationary brake disc connected to said stationary member, a rotating brake housing, at least one rotating brake disc connected to said brake housing for frictionally engaging said stationary disc, means for actuating said vehicle brake by frictionally engaging said rotating disc with said stationary disc, reaction means mounted concentrically with said rotating and said stationary discs, a cooling fluid pump assembly mounted concentrically with said rotating and said stationary discs and disposed between said reaction means and said brake discs, said brake housing enclosing said brake discs and said cooling fluid pump and said reaction means and forming a first pressure chamber about the outer periphery of said brake discs and said pump and said reaction means, said reaction means forming a fluid supply chamber about the inner periphery of said reaction means and on one side of said pump, a second pressure chamber formed on the other side of said pump and about the outer periphery of said stationary member and the inner periphery of said braking discs, and in fluid communication with said first pressure chamber through passage means formed in said discs, said cooling fluid pump pressurizing fluid in said first pressure chamber to bias said cooling fluid pump assembly to a frictionally engaging position with said reaction means, and venting means in said reaction means to limit the pressurized area on the reaction plate side of said cooling fluid pump and thereby control the frictional engagement of said reaction plate with said cooling fluid pump.

2. In a vehicle brake comprising, in combination, a stationary member, at least one stationary disc connected to said stationary member, a rotating brake housing, at least one rotating disc connected to said brake housing, said brake housing enclosing said rotating and stationary discs, hydraulic means for frictionally engaging said rotating and said stationary disc, reaction means mounted on said stationary member and concentrically with said discs, a cooling fluid pump disposed between said reaction means and said brake discs and engageable therewith for pump operation, a supply chamber formed by said reaction means and said cooling fluid pump and said stationary member, pressure chamber means formed by said cooling fluid pump and said brake discs and said brake housing, passage means about the outer periphery of said cooling fluid pump connecting the portion of said pressure chamber means on the brake disc side of said cooling fluid pump to the portion of the pressure chamber means on the reaction means side of said cooling fluid pump, and venting means in said reaction means to limit the fluid pressure force on the reaction means side of said cooling fluid pump and control the frictional engagement of the cooling fluid pump with said reaction means and thereby controlling the operation of said cooling fluid pump when said vehicle brakes are retracted.

3. In a vehicle brake comprising in combination, a stationary member, at least one stationary disc connected to said stationary member, a brake housing member, at least one rotating disc connected to said housing member, said brake housing member enclosing said discs, a cooling fluid pump, a first pressure chamber formed by the outer periphery of said discs and said brake housing member and said pump, a reaction plate mounted concentrically with said discs on said stationary member, said cooling fluid pump disposed between and operating by engaging said reaction plate and said discs, hydraulic means for compressing the disc stack formed by said rotating discs and said stationary discs to provide brake actuation, a supply chamber formed by the inner periphery of said reaction plate and said pump and said stationary member, a second pressure chamber formed by the outer periphery of said reaction plate and said housing member and said cooling fluid pump and in fluid pressure communication with said first pressure chamber, said cooling fluid pump providing a suction in said supply chamber and pressurized fluid in said first and second pressure chambers, and venting means between said second pressure chamber and said supply chamber to limit the back pressure area on the reaction plate side of said cooling fluid pump subjected to pressure in said second pressure chamber and thereby control the effective force of the pressure in said second pressure chamber acting on the reaction plate side of said pump in relation to the effective force of the pressure in said first pressure chamber acting on the disc side of said pump to create a limiting operating force by frictional engagement between the cooling fluid pump assembly and said reaction plate when said vehicle brakes are retracted.

4. In a vehicle brake, comprising in combination, a stationary member, at least one stationary disc connected to said stationary member, a rotating housing member, at least one rotating disc connected to said rotating member for frictionally engaging said stationary disc, means for frictionally engaging said rotating disc with said stationary disc to actuate said vehicle brake, a reaction plate mounted on said stationary member concentrically with said discs, a fluid cooling pump disposed between and operating by engagement with said reaction plate and the disc stack formed by said rotating and stationary discs, said housing member enclosing said rotating and stationary discs and said cooling fluid pump, a first pressure chamber formed by the outer periphery of said discs and said pump and the inner periphery of said housing member, a supply chamber formed by the inner periphery of said reaction plate and said pump and said stationary member, a second pressure chamber formed in the inner periphery of said discs when said brakes are in a retracted position, and venting means in said reaction plate to provide a limited pressure in said first pressure chamber and thereby control the effective force from the pressure in said first pressure chamber on the disc side of said cooling fluid pump biasing said cooling fluid pump to frictional engagement with said reaction plate and thereby provide limited pumping action of said cooling fluid pump when said vehicle brakes are in the retracted position.

5. In a vehicle brake comprising in combination, a stationary member, at least one stationary disc connected to said stationary member, a rotating member, at least one rotating disc connected to said rotating member for frictionally engaging said stationary disc, means for frictionally engaging said rotating and said stationary disc when said vehicle brakes are actuated, a reaction plate mounted on said stationary member engaging one stationary disc and providing the reaction force when said brakes are actuated, a cooling fluid pump concentrically mounted on said stationary member and disposed between said reaction plate and said discs and engageable therewith for pump operation, thermally responsive means mounted in said cooling fluid pump having an expansible element to frictionally engage said stationary disc and bias said cooling fluid pump to frictionally engage said reaction plate thereby causing limited actuation of said cooling fluid pump when the fluid temperature of said cooling fluid is above a predetermined temperature.

6. In a vehicle brake comprising in combination, a stationary member, at least one stationary disc connected to said stationary member, a rotating member, at least one rotating disc connected to said rotating member and for frictionally engaging said stationary disc, means for actuating said fluid brake by frictionally engaging said rotating disc with said stationary disc, a reaction plate concentrically mounted on said stationary member and providing the reaction force when said brakes are actuated, a cooling fluid pump concentrically mounted on said stationary member and disposed between and engageable with said reaction plate and said discs for pump operation, a supply chamber formed by the inner periphery of said reaction plate and said stationary member and said cooling fluid pump, said rotating member enclosing said discs and said cooling fluid pump, pump output pressure chamber means formed by the outer periphery of said discs and said reaction plate and said cooling fluid pump and said rotating member, venting means between said pressure chamber means and said supply chamber to limit the pressurized pump area in said pressure chamber means on the reaction plate side of the cooling pump, and thermally responsive means having an expandable element in said cooling pump to bias a portion of said thermally responsive means to frictionally engage one of said stationary discs, said thermally responsive means biasing said cooling pump to a frictionally engaging position with said reaction plate to provide limited operation of said cooling fluid pump when said vehicle brakes are retracted.

7. In a vehicle brake, comprising in combination, a stationary member, at least one stationary disc connected to said stationary member, a rotating member, at least one rotating disc connected to said rotating member for frictionally engaging said stationary disc, means for actuating said vehicle brake by frictionally engaging said rotating disc with said stationary disc, a reaction plate mounted on said stationary member concentric with said discs for providing the reaction force when said vehicle brakes are actuated, a cooling fluid pump engageable with and disposed between said reaction plate and said discs for pump operation, a brake housing enclosing said discs and said cooling fluid pump and forming pressure chamber means about the outer periphery of said discs and said pump and said reaction plate, a supply chamber formed by the inner periphery of said reaction plate adjacent said stationary member, said reaction plate having a pump contacting portion with an annular groove formed thereon adjacent said cooling fluid pump, venting means from said annular groove to said supply chamber to provide limited pressure area on the reaction plate side of said cooling fluid pump, and thermally responsive means mounted in said pump and having a thermally expandable element engaging said stationary brake disc and biasing said cooling fluid pump to a frictional contacting position with said reaction plate pump contacting portion and thereby providing limited operation of said cooling fluid pump in response to the temperature of the cooling fluid in said vehicle brake.

8. In a vehicle brake, comprising in combination, a stationary member, at least one stationary disc connected to said stationary member, a rotatable member, at least one rotatable disc connected to said rotatable member concentrically mounted for frictionally engaging said stationary disc, means for actuating said vehicle brake by frictionally engaging said rotatable disc with said stationary disc, a reaction plate concentrically mounted on said stationary member concentric with said brake discs for providing a reaction force when said brake is actuated, a cooling fluid pump rotatably mounted on said stationary member between said discs and said reaction plate for rotation with said rotatable member and for pump operating engagement with said reaction plate and said stationary disc adjacent said cooling fluid pump, a thermally responsive unit in said pump, means engaging said stationary member and said stationary disc adjacent said cooling fluid pump and biasing said stationary disc to a predetermined position in spaced relation to said reaction plate to form a reaction means for said thermally responsive unit when said brake is in the retracted position, said thermally responsive unit being carried in said cooling fluid pump and having an expandable element responsive to the temperature of the cooling fluid thereby biasing a portion of said thermally responsive unit to frictionally contact said adjacent stationary disc, and venting means in said reaction plate to the input side of said pump to limit the pressurized area on the reaction plate side of said cooling fluid pump to provide limited pumping action of said cooling fluid pump, said thermally responsive unit providing frictional engagement with said adjacent stationary disc and said reaction plate with said fluid cooling pump to control the operation of said cooling fluid pump in response to the temperature of said cooling fluid when said vehicle brake is retracted.

9. In a vehicle brake comprising in combination, a stationary member, at least one stationary brake disc connected to said stationary member, a rotating brake housing, at least one rotating brake disc connected to said rotating housing for frictionally engaging said stationary disc, hydraulic means for frictionally engaging said rotating disc with said stationary disc when said vehicle brakes are actuated, a reaction plate mounted on said stationary member for providing a reaction force when said vehicle brake is actuated, a cooling fluid pump having an inlet and an outlet and disposed between and operated by engagement with said reaction plate and the disc stack formed by said rotating and stationary discs, said brake housing enclosing said disc stack and said cooling fluid pump and said reaction plate and cooperating with said disc stack and said pump and said reaction plate to form a first pressure chamber on the inner periphery of said brake housing, a cooling fluid supply pressure chamber formed by the inner periphery of said reaction plate at said cooling fluid pump inlet, a third pressure chamber formed between the adjacent sides of said rotating and said stationary brake discs and about the inner periphery of said disc stack, and venting means in said reaction plate to limit the pressurized area of said first pressure chamber on the reaction plate side of said cooling fluid pump and thereby control the effective force from said first pressure chamber on the disc stack side of said cooling fluid pump biasing said cooling fluid pump to frictionally engage said reaction plate and thereby provide limited pumping action of said cooling fluid pump when said vehicle brakes are in the retracted position.

10. In a vehicle brake comprising in combination, a stationary member, at least one stationary brake disc connected to said stationary member, a rotating housing, at least one rotating brake disc connected to said rotating housing for frictionally engaging said stationary disc, said brake discs forming a disc stack, means for frictionally engaging said stationary disc with said rotating disc to actuate said vehicle brake, a reaction plate mounted on said stationary member concentrically with said brake discs to provide a reaction force when said vehicle brake is actuated, a cooling fluid pump mounted coaxially with and disposed between and operating by engaging said reaction plate and said disc stack, said housing enclosing said cooling fluid pump and said reaction plate and forming a first high pressure chamber on the inner periphery of said brake housing and the outer periphery of said disc stack and one side of said cooling fluid pump, a second high pressure chamber formed on the inner periphery of said brake housing and the outer periphery of said reaction plate and the other side of said cooling fluid pump, said second high pressure chamber being in fluid pressure communication with said first high pressure chamber, a supply pressure chamber formed on the inner periphery of said reaction plate adjacent to the inlet of said cooling fluid pump, an intermediate pressure chamber formed between the adjacent engaging sides of said rotating and said stationary discs and the inner periphery of said disc stack when said vehicle brake is in the retracted position, venting means in said reaction plate to provide limited pressure in said second high pressure chamber acting on said cooling fluid pump and thereby control the effective force of the pressure in said first high pressure chamber on the disc side of said cooling fluid pump biasing said cooling fluid pump to frictional engagement with said reaction plate for limited operation of said cooling fluid pump, a plurality of thermally responsive units carried within said cooling fluid pump, each of said thermally responsive units having an expandable element responsive to the temperature of the cooling fluid in said vehicle brake and reaction means engaging said stationary member and said stationary brake disc adjacent to said cooling fluid pump to position said adjacent stationary disc a predetermined distance from said reaction plate, said expandable elements of said thermally responsive units expanding to bias a portion of said elements to frictionally engage said adjacent brake disc and further bias said cooling fluid pump to a frictional engaging position with said reaction plate to provide limited operation of said cooling fluid pump in direct proportion to the temperature of the cooling fluid of said vehicle brake when said vehicle brake is in the retracted position.

11. In a vehicle brake, comprising in combination, a stationary member, at least one stationary brake disc connected to said stationary member, a rotating brake housing, at least one rotating brake disc connected to said rotating housing for frictionally engaging said stationary disc, said brake discs forming a disc stack, means for frictionally engaging said rotating disc with said stationary disc to actuate said vehicle brake, a reaction plate mounted on said stationary member concentrically with said disc stack to provide a reaction force when said vehicle brake is actuated, a cooling fluid pump mounted coaxially with and disposed between and operating by engaging said reaction plate and the adjacent stationary brake disc, said reaction plate having a surface for frictionally engaging said pump, said housing enclosing said disc stack and said cooling fluid pump and said reaction plate and forming a first pressure chamber about the inner periphery of said housing and the outer periphery of said reaction plate, a second pressure chamber formed about the inner periphery of said reaction plate adjacent to the inlet of said cooling fluid pump, a third pressure chamber formed between the engaging surfaces of said disc stack and said pump and the inner periphery of said housing, venting means in said reaction plate including an annular groove in said frictionally engaging surface of said reaction plate adjacent to said cooling fluid pump and a passage connecting said annular groove to said second pressure chamber to limit said first pressure chamber pump area on the reaction plate side of the said cooling fluid pump, a plurality of thermally responsive units carried in said cooling fluid pump, said cooling fluid pump including a ring gear connected to and rotating with said rotating brake housing, a sun gear rotatably mounted on said stationary member, and a pump housing enclosing a plurality of planetary gears, said pump housing engaging said ring gear and said sun gear to provide a pumping action when said pump housing is retarded by frictional engagement with the adjacent stationary brake disc and said reaction plate, each of said plurality of heat responsive units having a thermally expandable element for frictionally engaging said adjacent stationary brake disc when the predetermined temperature is present in the cooling fluid, said expandable elements engaging said adjacent stationary brake disc and biasing said cooling fluid pump to frictionally engage said pump housing with said reaction plate and thereby provide limited operation of said cooling fluid pump in response to the temperature of the cooling fluid and provide operation of said cooling fluid pump when said vehicle brake is in the retracted position.

12. In a vehicle brake comprising in combination, a stationary member, at least one stationary brake disc connected to said stationary member, a rotating brake housing, at least one rotating brake disc connected to said rotating brake housing for frictionally engaging said stationary brake disc, said brake disc forming a disc stack, means for frictionally engaging said rotating brake disc with said stationary brake disc when said vehicle brake is actuated, a reaction plate concentrically mounted on said stationary member in alignment with said brake discs to provide a reaction force when said vehicle brake is actuated, a cooling fluid pump mounted coaxially with and between and in pump operating engageable relation with said reaction plate and said brake discs, said cooling fluid pump comprising a ring gear rotating with said brake housing and a sun gear rotatably mounted on said stationary member and a pump housing and a plurality of planetary gears supported by said pump housing and meshing with said ring gear and said sun gear to provide a pumping operation when said pump housing frictionally engages the adjacent stationary brake disc and said reaction plate, said brake housing forming a first pressure chamber about the outer periphery of said disc stack and said cooling fluid pump and said reaction plate, a pressure fluid supply chamber formed by the inner periphery of said reaction plate and said stationary member, second pressure chamber formed between the adjacent frictional surfaces of said rotating and said stationary discs and the inner periphery of said disc stack, and venting means in said reaction plate on the frictional surface engaging said cooling fluid pump housing formed by an annular groove vented to said pressure fluid supply chamber thereby limiting the pump pressurized area of said first pressure chamber on the reaction plate side of said fluid cooling pump and providing a predetermined pump operation when said vehicle brake is retracted.

No references cited.